United States Patent
Hellmuth et al.

(10) Patent No.: US 10,252,863 B2
(45) Date of Patent: Apr. 9, 2019

(54) DRIVE FOR A BELT CONVEYOR SYSTEM, METHOD FOR MOUNTING A DRIVE ON A BELT CONVEYOR SYSTEM, AND BELT CONVEYOR SYSTEM

(71) Applicant: Siemens Aktiengesellschaft, Munich (DE)

(72) Inventors: Torsten Hellmuth, Erlangen (DE); Erik Krompasky, Nučice (CZ); Guenther Winkler, Haibach (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/756,433

(22) PCT Filed: Jul. 29, 2016

(86) PCT No.: PCT/EP2016/068144
§ 371 (c)(1),
(2) Date: Feb. 28, 2018

(87) PCT Pub. No.: WO2017/041958
PCT Pub. Date: Mar. 16, 2017

(65) Prior Publication Data
US 2018/0244475 A1 Aug. 30, 2018

(30) Foreign Application Priority Data
Sep. 9, 2015 (EP) .................................... 15184418

(51) Int. Cl.
*B65G 23/22* (2006.01)
*B65G 21/10* (2006.01)
*F16C 32/00* (2006.01)

(52) U.S. Cl.
CPC ............ *B65G 23/22* (2013.01); *B65G 21/105* (2013.01); *F16C 32/00* (2013.01); *B65G 2811/09* (2013.01)

(58) Field of Classification Search
CPC .... B65G 23/22; B65G 23/24; B65G 2811/09; B65G 21/105; B65G 39/02; B65G 39/09; F16C 32/00
See application file for complete search history.

(56) References Cited

U.S. PATENT DOCUMENTS

| | | | | |
|---|---|---|---|---|
| 5,711,221 A | * | 1/1998 | Compera | ............ B41F 13/0045 |
| | | | | 101/216 |
| 7,543,700 B2 | * | 6/2009 | Simke | .................... B65G 23/08 |
| | | | | 198/788 |

(Continued)

FOREIGN PATENT DOCUMENTS

| | | |
|---|---|---|
| CA | 2568646 | 12/2005 |
| CA | 2568676 | 5/2008 |

(Continued)

OTHER PUBLICATIONS

Translation of the International Preliminary Report on Patentability based on PCT/EP2016/068144 dated Sep. 1, 2016.

(Continued)

*Primary Examiner* — Gene O Crawford
*Assistant Examiner* — Keith R Campbell
(74) *Attorney, Agent, or Firm* — Cozen O'Connor

(57) ABSTRACT

A drive for a belt conveyor system includes a permanently excited synchronous motor having a stator and a rotor, wherein a gap size is formed between the rotor and the stator, and a holding device is provided, which is secured to the stator via a first securing device and to the rotor via a second securing device in order to provide secure assembly of the drive, such that the gap size is maintained, where the first securing device and/or the second securing device are (Continued)

detachably formed, such that an uninterrupted operation of the belt conveyor system is guaranteed.

19 Claims, 4 Drawing Sheets

(56) References Cited

U.S. PATENT DOCUMENTS

| | | | | |
|---|---|---|---|---|
| 2006/0272523 | A1 | 12/2006 | Dittenhofer | |
| 2012/0298483 | A1* | 11/2012 | Weber | B65G 23/22 198/570 |
| 2013/0306443 | A1* | 11/2013 | Rathmann | B65G 39/02 198/835 |
| 2014/0291126 | A1 | 10/2014 | Becker et al. | |
| 2015/0353198 | A1* | 12/2015 | Stegmiller | H02K 17/02 244/137.1 |
| 2017/0283177 | A1* | 10/2017 | Ramezani | B65G 13/07 |

FOREIGN PATENT DOCUMENTS

| | | |
|---|---|---|
| DE | 1842769 | 11/1961 |
| EP | 2562102 | 2/2013 |
| EP | 2905877 | 8/2015 |

OTHER PUBLICATIONS

PCT International Examination Report and Written Opinion of International Examination Authority dated May 9, 2017 corresponding to PCT International Application No. PCT/EP2016/068144 filed Jul. 29, 2016.

* cited by examiner

DRIVE FOR A BELT CONVEYOR SYSTEM, METHOD FOR MOUNTING A DRIVE ON A BELT CONVEYOR SYSTEM, AND BELT CONVEYOR SYSTEM

CROSS-REFERENCE TO RELATED APPLICATIONS

This is a U.S. national stage of application No. PCT/EP2016/068144 filed 29 Jul. 2016. Priority is claimed on European Application No. 15184418 filed Sep. 9, 2015, the content of which is incorporated herein by reference in its entirety.

BACKGROUND OF THE INVENTION

1. Field of the Invention

The invention relates to a drive for a belt conveyor system, comprising a permanently excited synchronous motor having a stator and a rotor, where a gap size is formed between the rotor and the stator, to a method for mounting the drive on a belt conveyor system comprising a drive roller arranged on a drive shaft, where the drive comprises a permanent magnet excited synchronous motor having a stator and a rotor, and to a belt conveyor system having such a drive.

2. Description of the Related Art

EP 2 562 102 A1 discloses a conventional belt conveyor system having a direct drive is known from. The belt conveyor system described there is intended for heavy industry, in particular for the raw materials or mining industries and includes a supporting structure, a conveyor belt and a drive device for driving the conveyor belt. The drive device comprises a drive shaft, at least one drive shaft bearing arrangement, a drive roller and an externally excited drive motor in the form of a frequency inverter fed alternating current synchronous motor having a stator and a rotor. The drive shaft and the drive motor are connected in a gearless manner to each other and there is a coaxial arrangement of rotor and drive shaft, where the drive shaft is guided through the rotor. This is a direct drive in which there are no components between the drive motor and the drive shaft which convert the rotor speed into a different drive shaft speed. The drive shaft is thus turned at the same speed as is predetermined by the rotor. Both the drive shaft and the stator of the drive motor are arranged on the stable supporting structure so that a gap size between rotor and stator required for correct motor operation is ensured. The gap size between the rotor and stator usually has a value of 5 to 15 mm for such an application. In order to ensure correct operation, a tolerable displacement between the rotor and stator is normally in the range of 10 to 15% of the gap size.

With such a bearing-free direct drive, the rotor and the stator are transported separately. The assembly of a motor is only completed when the rotor is flange-mounted to the drive shaft. Particularly in the case of permanently excited motors, also referred to as permanent magnet excited motors, the assembly on site is very demanding because the magnetic forces between rotor and stator can be difficult to manage. Shaftless and bearing-free permanent magnet excited synchronous machines have not therefore as a general rule been used hitherto for the application in a belt conveyor system for the raw materials or mining industries.

In order to be able to make increased use of the advantages (no separate shaft, no separate bearings, therefore no bearing maintenance, no clutch between motor and drive drum) of a bearing-free direct drive, it is necessary to transport the drive securely as a unit and to assemble it quickly.

SUMMARY OF THE INVENTION

In view of the foregoing, it is therefore an object of the invention to ensure a secure assembly of a shaftless drive of a permanently excited synchronous motor.

This and other objects and advantages are achieved in accordance with the invention by a drive for a belt conveyor system, comprising a permanently excited synchronous motor having a stator and a rotor, where a gap size is formed between the rotor and the stator, where a holding device is provided which is secured to the stator via a first securing device and to the rotor via a second securing device, and where the first and/or the second securing devices are releasable.

It is also an object of the invention to provide a method for mounting a drive on a belt conveyor system comprising a drive roller arranged on a drive shaft, where the drive comprises a permanently excited synchronous motor having a stator and a rotor, where in a first step, the rotor is inserted into the stator, and in a second step, the rotor is fixed in relation to the stator via a holding device which is secured to the stator via the first securing device and to the rotor via the second securing device, so that a gap size is maintained between the rotor and the stator. In a third step, the drive and the drive shaft are connected to each other in a gearless manner, and in a fourth step, the first securing device and/or the second securing device are released.

It is also an object of the invention to provide a belt conveyor system having such a drive.

The advantages and preferred embodiments stated below in relation to the drive can be applied by analogy to the method and the belt conveyor system.

The drive in question is a direct drive in which there are no gear elements between the drive motor and the drive shaft which convert the rotor speed into a different drive shaft speed. In the assembled state, the drive here is arranged in particular between the drive drum and a drive shaft bearing arrangement.

The invention is based on the consideration of keeping a constant gap size during transportation, during assembly of the drive and also later during maintenance work on the belt conveyor system by fixing the stator and the rotor to each other with the aid of a holding device. This is made possible by providing a direct or indirect connection between the holding device on the one side and the stator or the rotor on the other side. In this situation, contact between the stator and rotor is prevented. After assembly has occur, when the stator and the rotor are fixedly mounted in their final position in the belt conveyor system, the holding device is separated from the stator via the releasable first securing device and/or is separated from the rotor via the releasable second securing device, so that the rotor is able to rotate relative to the stator during operation of the belt conveyor system.

The main advantages of such a holding device are the high degree of flexibility and safety during assembly and disassembly of the drive. In particular, the problem of the strong magnetic forces between rotor and stator is overcome for the rotor used which is equipped with magnet excitation. It is thus possible to transport and install the drive as a whole and not its individual components.

The belt conveyor system that contains such a drive also has further advantages. When the direct drive is positioned between the drive drum and the drive shaft bearing arrangement, the deflection of the drive shaft is greatly reduced. A further advantage of this arrangement is the unrestricted accessibility of the drive shaft bearing arrangement. This means that a bearing replacement can be carried out without disassembling the drive.

In accordance with a preferred embodiment, at least the second securing device for releasing the connection of the holding device to the rotor are releasable so that the holding device is only decoupled from the rotor. During operation of the belt conveyor system, the holding device remains coupled to the stator. Here, the main advantage is that the holding device remains stationary during operation, in other words it does not rotate with the rotor. In this way, a static mounting of the holding device is ensured which, as a general rule, is less susceptible to faults than if the holding device were also to rotate during operation.

By preference, the holding device is configured such that an air gap is created between the holding device and the stator or the rotor when the first or second securing devices are released. In particular, depending on whether the connection with the stator or the rotor is released, the holding device is kept at a distance therefrom so that there is no contact that could impair the proper functioning of the drive during operation.

Furthermore, the holding device is preferably configured to accommodate a seal. The holding device is thus used during operation of the belt conveyor system to protect the direct drive against dust and moisture.

The holding device is preferably formed as an angled flange ring which, in particular, has a continuous circumference. Due to its ring-shaped configuration, the holding device is particularly well suited for a direct or indirect connection at the end of the stator and rotor, where the largest possible contact surfaces are present. The securing devices are provided in the area of the contact surfaces, which securing device in particular are evenly distributed around the circumference of the flange ring.

The holding device is connected to the rotor and stator in a particularly simple manner in that the first and/or the second securing devices are advantageously formed as screws. A screw connection is easy to establish and to release. In addition, it can be established and released on multiple occasions during maintenance and repair work, thus making the use of new or additional securing devices unnecessary.

Expediently, the holding device is made of a metallic material, in particular from steel. A metallic material best meets the requirements regarding stability and load-bearing capacity of the holding device when it is used to fix the rotor with respect to the stator.

In accordance with a preferred embodiment of the method, the first and the second method steps are performed at a location other than the assembly site of the subsequent steps. This means that the rotor is already inserted into the stator housing by the drive manufacturer and fixed there by the holding device because performing this demanding work on a construction site is not possible or only possible with a great deal of effort.

In terms of an improved accessibility to the components of the belt conveyor system, in accordance with a further preferred embodiment of the method, for maintenance and repair work on the belt conveyor system, the released first or second securing devices will be re-used to establish the connection between the rotor and the stator, and the drive is separated from the drive shaft. If work is required, such as on the drive shaft or the drive drum, the connection between the holding device and the rotor or stator that is released after the assembly of the drive is reestablished. In this way, the gap size is kept constant and the rotor can be decoupled from the drive shaft without having to move the rotor out of the stator housing.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the invention will be explained in detail with reference to a drawing, in which.

DETAILED DESCRIPTION OF THE EXEMPLARY EMBODIMENTS

Figure 1:
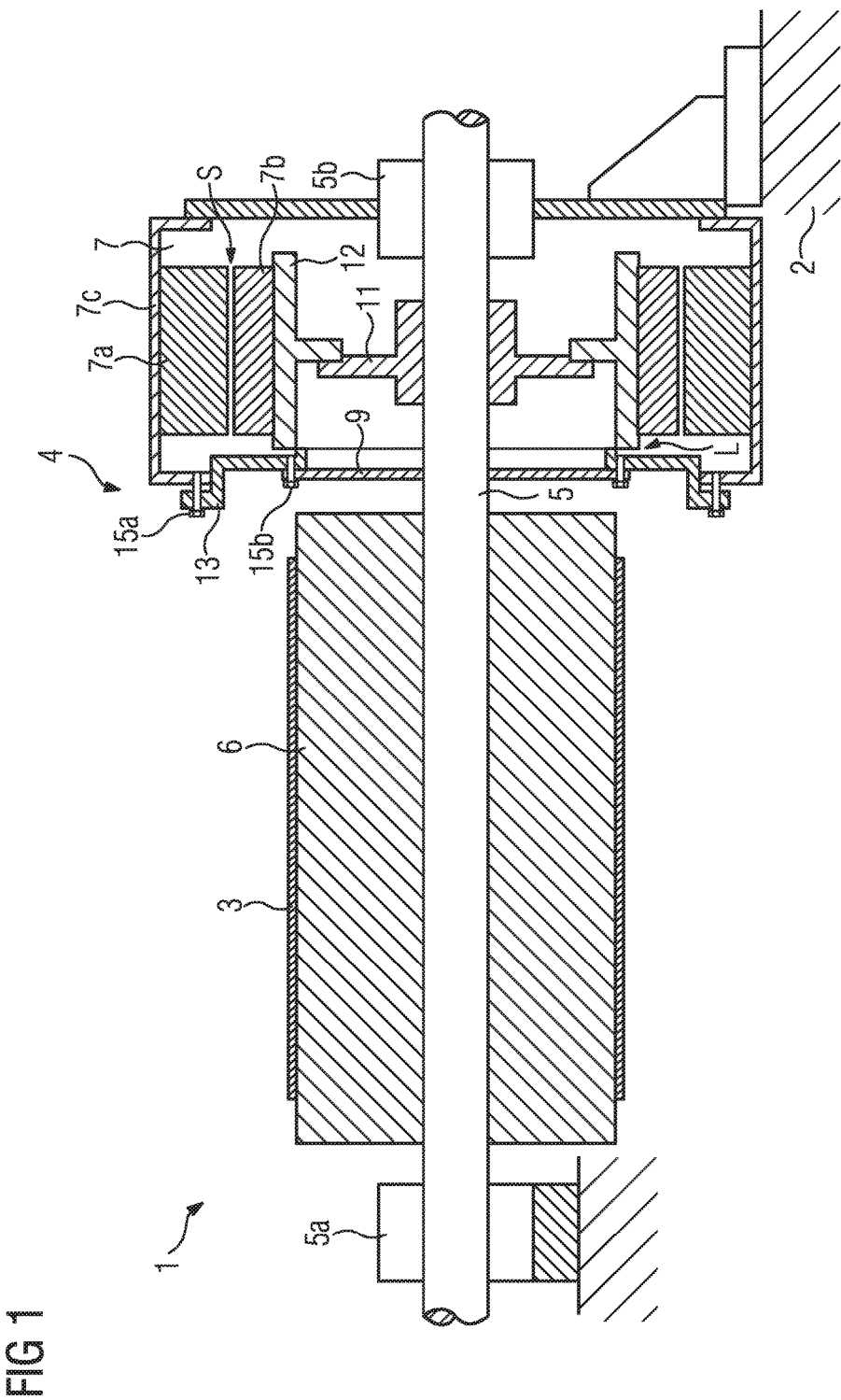
FIG. 1 shows a longitudinal section of a first embodiment variant of a belt conveyor system having a direct drive and a holding device for the drive in accordance with the invention.

The same reference characters have the same meaning in the different figures.

FIG. 1 shows a schematic and greatly simplified view of a belt conveyor system 1 for heavy industry, in particular for the raw materials or mining industries. The belt conveyor system 1 is mounted on a supporting structure 2. The belt conveyor system 1 shown in FIG. 1 comprises a conveyor belt 3 and a drive 4 for driving the conveyor belt 3, a drive shaft 5, two drive shaft bearing arrangements 5a, 5b and a drive roller 6. Here, the drive roller 6 is made of solid material, but can equally be formed hollow. The drive roller 6 and the drive 4 are arranged between the two drive shaft bearing arrangements 5a, 5b.

A further drive motor can optionally be arranged on the drive shaft 5 to the side of the drive roller 6 on the side facing away from the drive motor 7. It is also possible to arrange further drive rollers 6 on the drive shaft 5.

In its original state prior to incorporation in the belt conveyor system 1, the drive 4 is a shaftless, bearing-free drive that comprises a permanently excited synchronous motor 7, also referred to as drive motor, having a stator 7a and a rotor 7b. The rotor 7b and the stator 7a are located in a motor housing 7c with which the stator 7a is fixedly connected. When the drive 4 is incorporated on the side of the motor housing 7c facing the drive roller 6, a seal 9 is fitted that protects the drive 4 against dust and moisture.

The drive shaft 5 and the drive motor 7 are connected to each other in gearless manner, with a coaxial arrangement of the rotor 7b and the drive shaft 5. The drive shaft 5 is guided through the rotor 7b and projects beyond the rotor 7b. In the illustrated exemplary embodiment, a shaft flange 11 is provided for securing the rotor 7b on the drive shaft 5. In this case, reference designator 12, serves to identify a hollow rotor shaft upon which a rotor package (including magnets) is mounted and can, however, be regarded as a component of the rotor 7b.

The spacing between the stator 7a and the rotor 7b is referred to as gap size S and maintenance of this spacing is decisive for the proper operation of the drive motor 7. In order to maintain this spacing during assembly of the drive 4 or during repair and maintenance work on the belt conveyor system 1, a holding device 13 is provided that fixes the stator 7a and the rotor 7b to each other.

In this case, the holding device 13 is formed as an angled, metallic flange ring made of steel and has essentially a continuous circumference. In this situation, the flange ring 13 is formed such that it bears on the motor housing 7c with a ring-shaped side and is connected to the motor housing 7c in the area of the contact surface and thus indirectly to the stator 7a. The flange ring 13 is also connected in a similar manner indirectly to the rotor 7b by a further ring-shaped side. A first securing device 15a is provided for securing the holding device 13 to the stator 7a or motor housing 7c and a second securing device 15b is provided for securing the holding device 13 to the rotor 7b (see FIG. 2), which securing devices comprise screws in the illustrated exemplary embodiment. However, it is also possible to use other types of securing devices, but it should be noted that they should be suitable for providing a releasable connection between the holding device 13 and the stator 7a or the rotor 7b.

Figure 2:
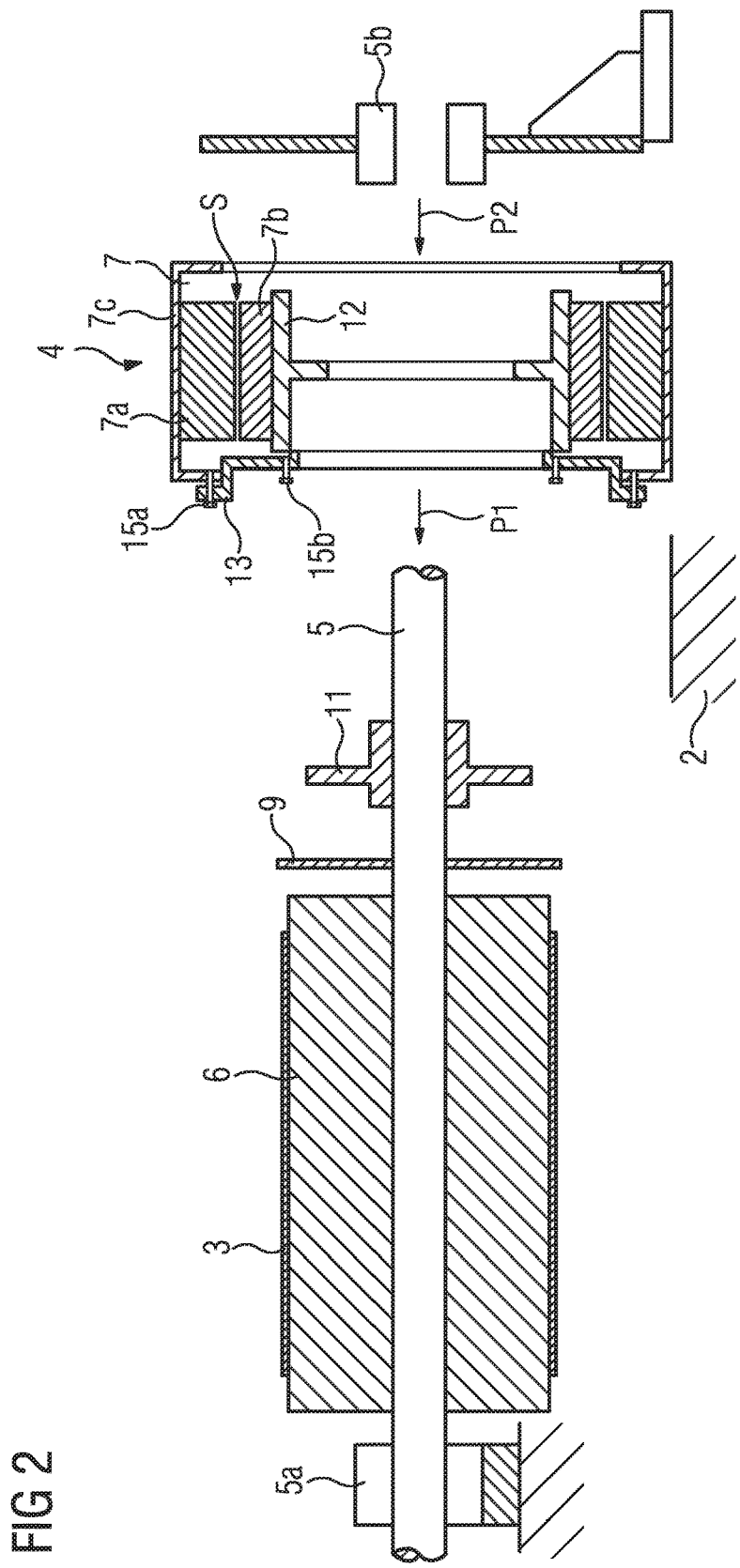
FIG. 2 shows a longitudinal section of the assembly of the belt conveyor system of FIG. 1.

With respect to FIG. 2, the assembly of the drive 4 and the function of the holding device 13 is as follows. In a first step, the rotor 7b is inserted into the stator 7a to produce the drive 4. Next, the rotor 7b is fixed in relation to the stator 7a by the holding device 13 which is secured to the stator 7a via the first screws 15a and is secured to the rotor 7b via the second screws 15b. In this way, the gap size S between the rotor 7b and the stator 7a is kept unchanged. The production of the drive 4 is performed in particular at a location other than the operating site of the belt conveyor system 1. The drive 4 can thus be transported as a unit, as illustrated in FIG. 2, for use in a belt conveyor system 1 and installed on site.

Only when the drive 4 is installed in the belt conveyor system 1 is the drive motor 7 fitted with a shaft, namely the drive shaft 5, which is connected to the rotor 7b in a gearless manner and is set in rotation by the rotor 7b.

The shaft flange 11 and the seal 9 are arranged on the drive shaft 5 in this case. When the drive 4 is installed on the drive shaft 5, indicated by the arrow P1, the connection is released via the screws 15b between the holding device 13 and the rotor 7b to establish the operating state of the drive 4 of FIG. 1, in which the rotor 7b is able to rotate. The connection 15b must not be released until the motor housing 7c has also been screwed to a bearing shield of the bearing 5b. This firstly ensures that the air gap S is maintained. In order to ensure that the rotary motion of the rotor 7b is not impeded by the holding device 13, the holding device 13 is moved to a spacing from the drive 4 so that an air gap L is created between the holding device 13 and the rotor 7b (see FIG. 1 and FIG. 2). The holding device 13, however, remains fixedly connected to the stator 7a and continues to serve as a support for the seal 9. In this situation, for example, the seal 9 is connected to the holding device 13 by way of the screws 15b.

Alternatively, it is also conceivable to release the screws 15a so that the holding device 13 is released from the stator and only remains secured to the rotor 7b and rotates therewith.

In order to complete the assembly of the drive 4, the drive shaft bearing arrangement 5b is also fitted on the drive shaft 5, as indicated by the arrow P2. In the exemplary illustrated embodiment, the drive shaft bearing arrangement 5b in the assembled state is integrated in the motor housing 7c.

Figure 3:
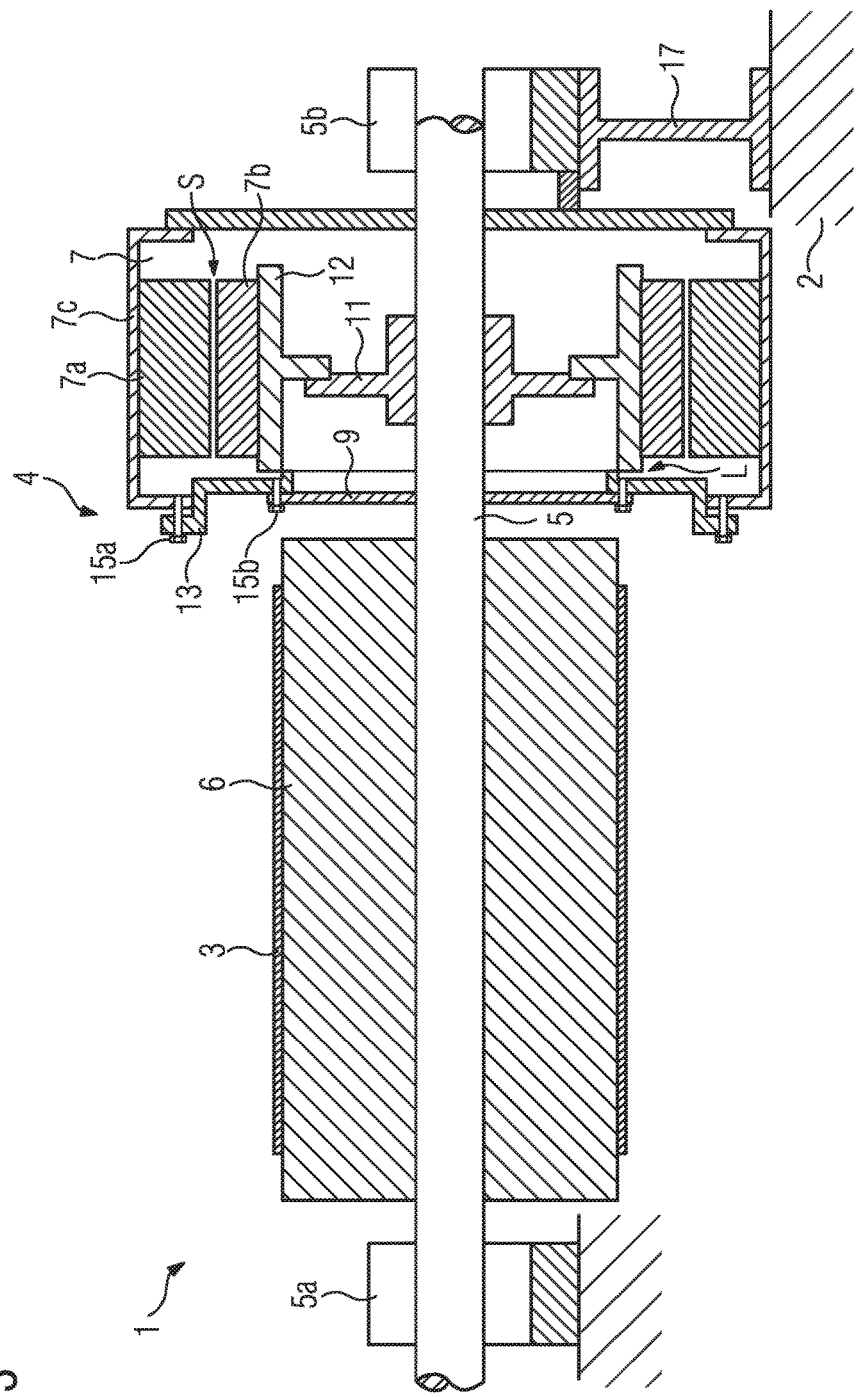
FIG. 3 shows a longitudinal section of a second embodiment of a belt conveyor system having a direct drive and a holding device for the drive in accordance with the invention.

FIG. 3 shows a schematic longitudinal section of a second drive 4 for a belt conveyor system 1. The drive 4 likewise comprises a drive shaft 5, two drive shaft bearing arrangements 5a, 5b, a drive roller 6 and a permanently excited drive motor 7 having a stator 7a and a rotor 7b. The difference from the first embodiment of the belt conveyor system lies in the fact that the drive shaft bearing arrangement 5b is not part of the motor housing 7c but is mounted on a separate bearing construction 17, which in particular is made of steel.

A major advantage of the arrangements described above is the good accessibility of the drive shaft bearing arrangements 5a, 5b for maintenance purposes without the need to remove the drive 4 at all. In the case of maintenance work, such as on the drive drum 6, the holding device 13 is connected to the rotor 7b again in order to fix the gap size S, and then the drive 4 can be removed.

Figure 4:
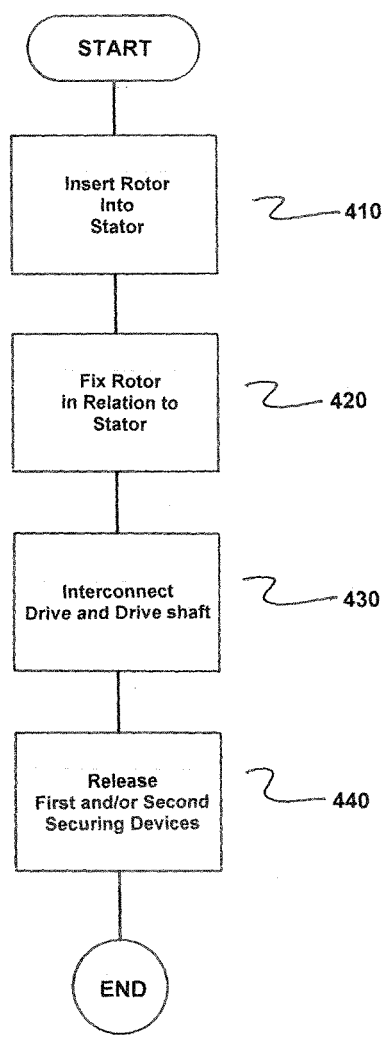
FIG. 4 is a flowchart of the method in accordance with the invention.

FIG. 4 is a flowchart of the method for mounting a drive 4 on a belt conveyor system 1 comprising a drive roller 6 arranged on a drive shaft 5, where the drive 4 comprises a permanently excited synchronous motor 7 having a stator 7a and a rotor 7b. The method comprises inserting the rotor 7b into the stator 7a, as indicated in step 410.

Next, the rotor 7b is fixed in relation to the stator 7a via a holding device 13 which is secured to the stator 7b via a first securing device 15a and to the rotor 7b via a second securing device 15b, such that a gap size S is maintained between the rotor 7b and the stator 7a, as indicated in step 420.

Next, the drive 4 and the drive shaft 5 are connected to each other in a gearless manner, as indicated in step 430. At least one of the first securing device 15a and the second securing device 15b are now released, as indicated in step 440.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A drive for a belt conveyor system, comprising:
  a permanently excited synchronous motor having a stator and a rotor radially within the stator, the rotor and the stator having a gap size formed therebetween; and a holding device secured to the stator via a first securing device and to the rotor via a second securing device, the at least one of the first and second securing devices being configured to be releasable;

wherein the holding device is structured such that an air gap is created between the holding device and the stator or rotor when the first or second securing devices are released.

2. The drive as claimed in claim 1, wherein at least the second securing device for releasing the connection of the holding device to the rotor is configured to be releasable.

3. The drive as claimed in claim 1, wherein the holding device is configured to accommodate a seal.

4. The drive as claimed in claim 1, wherein that the holding device is formed as an angled flange ring having a continuous circumference.

5. The drive as claimed in claim 1, wherein at least one of the first securing device and the second securing device comprises a screw.

6. The drive as claimed in claim 1, wherein the holding device is made of a metallic material.

7. The drive as claimed in claim 6, wherein the metallic material comprises steel.

8. A method for mounting a drive on a belt conveyor system comprising a drive roller arranged on a drive shaft, the drive comprising a permanently excited synchronous motor having a stator and a rotor radially within the stator, the method comprising:

inserting the rotor into the stator such that said rotor is radially within the stator;

fixing the rotor in relation to the stator via a holding device which is secured to the stator via a first securing device and to the rotor via a second securing device, such that a gap size is maintained between the rotor and the stator;

connecting the drive and the drive shaft to each other in a gearless manner; and releasing at least one of the first securing device and the second securing device.

9. The method as claimed in claim 8, further comprising: releasing at least the second securing device; and separating the rotor from the holding device.

10. The method as claimed in claim 8, wherein an air gap is created between the holding device and the stator or rotor when the first or second securing devices are released.

11. The method as claimed in claim 9, wherein an air gap is created between the holding device and the stator or rotor when the first or second securing devices are released.

12. The method as claimed in claim 10, further comprising:

fitting a seal to the holding device.

13. The method as claimed in claim 8, wherein the holding device comprises an angled flange ring having a continuous circumference.

14. The method as claimed in claim 8, wherein the holding device is connected to at least one of the stator and rotor via screw connections.

15. The method as claimed in claim 14, wherein the holding device is made of a metallic material.

16. The method as claimed in claim 15, wherein the metallic material comprises steel.

17. The method as claimed in claim 8, wherein said inserting and fixing the rotor are performed at a location other than an assembly site at which said subsequent connecting and releasing steps are performed.

18. The method as claimed in claim 8, wherein, for maintenance work on the belt conveyor system, at least one of the released first securing device and the second securing device are reused to establish a connection between the stator and the rotor, and the drive is separated from the drive shaft.

19. A belt conveyor system having the drive as claimed in claim 1.

* * * * *